United States Patent [19]

Monroe

[11] Patent Number: 5,073,842
[45] Date of Patent: Dec. 17, 1991

[54] ANTI-THEFT ILLUMINATED DISPLAY DEVICE

[76] Inventor: Gary W. Monroe, 6415 Old Maynardville Hwy., #1, Knoxville, Tenn. 37918

[21] Appl. No.: 470,832

[22] Filed: Jan. 25, 1990

[51] Int. Cl.⁵ .............................................. B60Q 1/56
[52] U.S. Cl. .................................. 362/83.2; 362/812; 40/201; 40/205
[58] Field of Search .................. 362/61, 80, 83.2, 812; 40/200, 201, 205, 546

[56] References Cited

U.S. PATENT DOCUMENTS

| 1,537,808 | 5/1925 | Douglas | 362/83.2 |
| 1,723,463 | 8/1929 | Brewster | 362/83.2 |
| 1,887,087 | 11/1932 | Frizner | 362/83.2 |
| 1,970,080 | 8/1934 | Edgerton | 362/83.2 |
| 2,189,149 | 2/1940 | Mead | 40/201 |
| 4,857,890 | 8/1989 | Solan | 362/83.2 |
| 4,891,895 | 1/1990 | DeLaquil, Jr. | 40/201 |

FOREIGN PATENT DOCUMENTS

| 2811185 | 9/1979 | Fed. Rep. of Germany | 40/201 |
| 2811656 | 9/1979 | Fed. Rep. of Germany | 40/201 |
| 8501871 | 1/1987 | Netherlands | 40/205 |

Primary Examiner—Ira S. Lazarus
Assistant Examiner—D. M. Cox
Attorney, Agent, or Firm—Pitts & Brittian

[57] ABSTRACT

An illuminated display device for a motor vehicle. The illuminated display device (10) comprises a lamp housing (12) for being secured to the license plate support structure of a vehicle in lieu of a license plate, the housing (12) having a rear wall (16) engaging the license plate support structure and defining a forwardly disposed opening (14). The housing (12) also includes a lower portion provided with license plate support brackets for engaging and supporting a license plate. A display panel (42) is mounted in the opening (14), at least a portion of which is translucent, and a lamp (34) is mounted within the lamp housing (12) for illuminating the display panel (42).

12 Claims, 5 Drawing Sheets 5,073,842

ANTI-THEFT ILLUMINATED DISPLAY DEVICE

TECHNICAL FIELD

This invention relates to an anti-theft illuminated display device for mounting on motor vehicles. In this particular invention, the device includes a lamp housing having an opening for receiving a display panel and a lamp mounted within the lamp housing for illuminating the display panel.

BACKGROUND ART

In recent years it has become popular to cover the unused license plate support structure on a motor vehicle with various decorative plates or panels. Such panels often display the names of sports team, the name of the owner of the vehicle, or in some cases advertisements. Generally, these display panels are unilluminated and are not readily viewable at night, and whereas there have been some illuminated display devices devised, they generally are not designed for direct mounting on the license plate support structure. Certain of these devices are disclosed in U.S. Pat. Nos. 1,625,798; 1,737,858; 1,734,575; 1,720,531; 2,045,863; 2,108,591; 2,122,027; 2,124,829; 2,156,753; 2,156,806; 2,171,820; 2,203,785; 2,305,372; 2,305,750; 2,618,089; 2,875,539; 3,335,269; 3,521,391; 3,921,324; 4,214,683; 4,443,832; 4,475,298; and 4,557,517.

Therefore, it is an object of this present invention to provide an illuminated display device for a motor vehicle for mounting on the license plate support structure of such vehicle in lieu of a license plate.

Another object of the present invention is to provide an illuminated display device which includes license plate support means for engaging and supporting a license plate.

Yet another object of the present invention is to provide an illuminated display device which includes display panels which are keyed for use only with a specific display device housing.

A further object of the present invention is to provide an illuminated display device which is inexpensive to manufacture and maintain.

DISCLOSURE OF THE INVENTION

Other objects and advantages will be accomplished by the present invention which provides an anti-theft illuminated display device for mounting on the license plate support structure of a motor vehicle in lieu of a license plate. The display device comprises a lamp housing for being secured in the license plate support structure, the housing having a rear wall and defining a forwardly disposed opening. Mounted on the rear wall of the housing is at lest one lamp. Further, a display panel is provided for covering the opening in the lamp housing, at least a portion of the display panel being translucent such that such portion of the display panel can be illuminated by the lamp. In one preferred embodiment the display device also comprises license plate support means for engaging and supporting a license plate.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
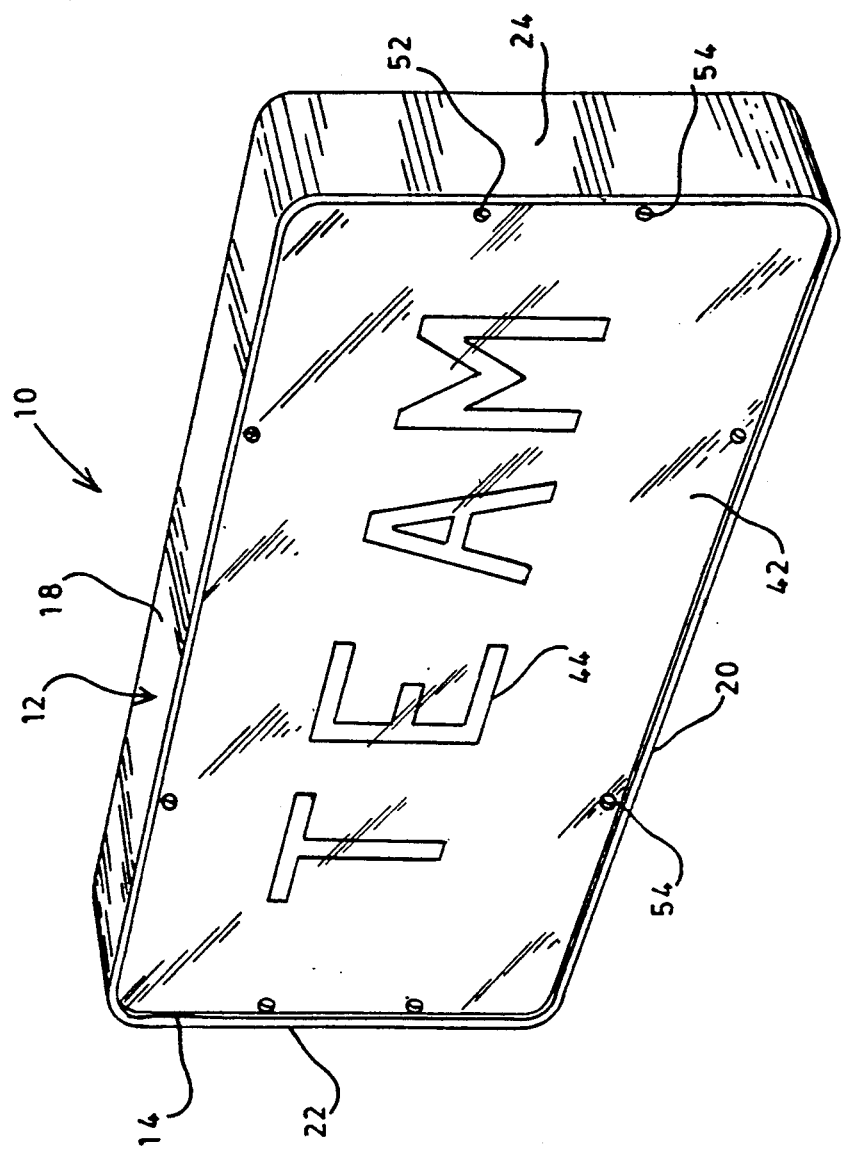
FIG. 1 illustrates a perspective view of an illuminated display device of the present invention.
Figure 2:
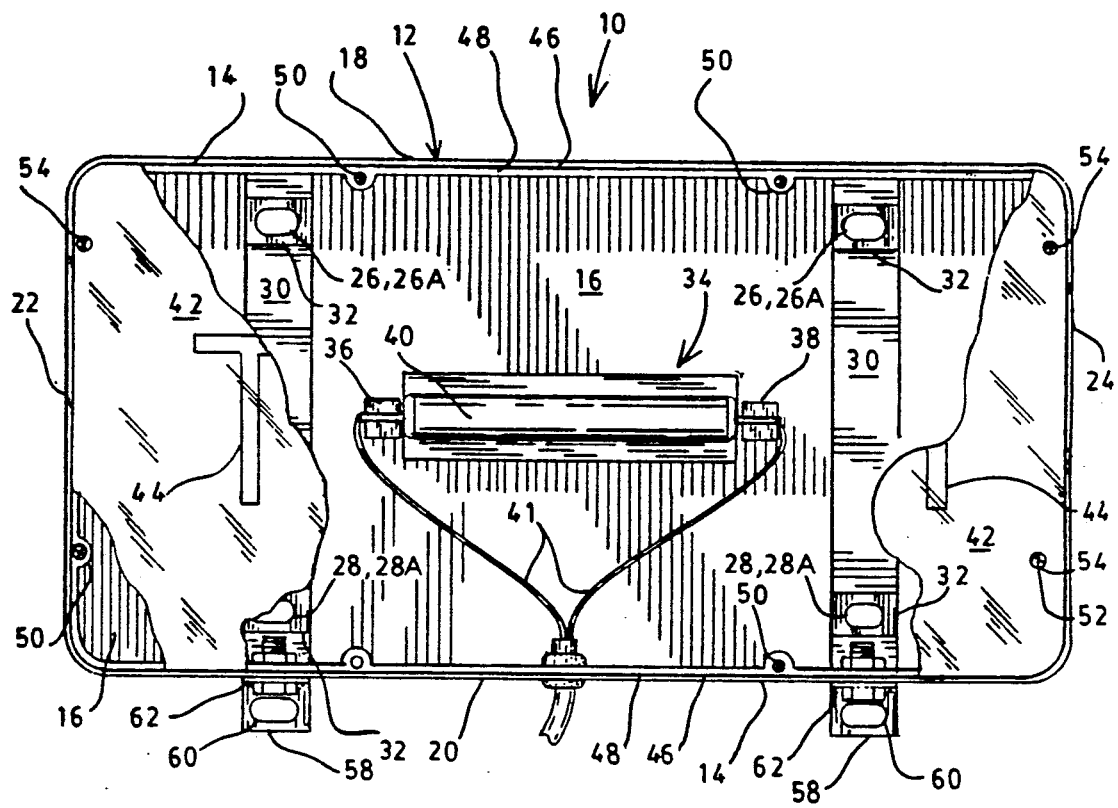
FIG. 2 illustrates front elevated view, partially in section, of an illuminated display device of the present invention.
Figure 3:
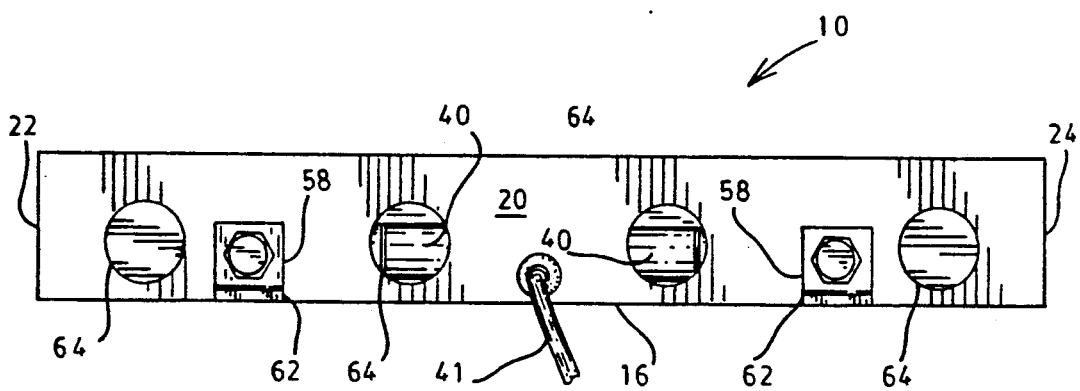
FIG. 3 illustrates a bottom view of an illuminated display device of the present invention.
Figure 4:
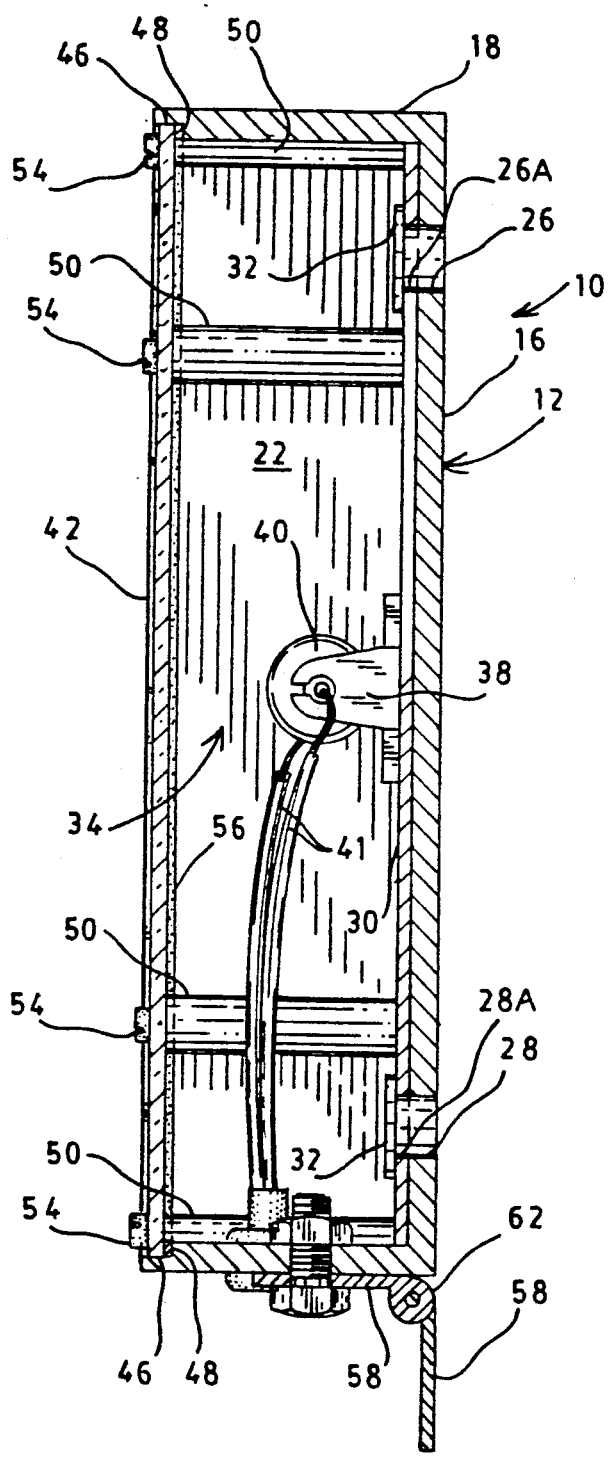
FIG. 4 illustrates a side elevation view, in section, of an illuminated display device of the present invention.

An anti-theft illuminated display device incorporating various features of the present invention is illustrated generally at 10 in FIGS. 1-4. The display device 10 is designed for being secured to the license plate support structure of a vehicle (not shown), either at the front or rear of the vehicle, and provides for the illuminated display of selected graphics and/or text, or other indicia.

The display device 10 comprises a lamp housing 12 having a forwardly disposed opening 14. In the illustrated preferred embodiment the housing 12 includes a rear wall 16, upper and lower walls 18 and 20, respectively, and opposite end walls 22 and 24, so as to define a rectangular configuration. However, it will be understood that the housing 12 can define other geometric configurations. For example, the sidewalls of the housing can be configured to define an elliptical shape such that the opening 14 defines an ellipse as well.

The rear wall 16 is provided with means for securing the lamp housing 12 to the license plate support structure of the vehicle. Such means includes at least a pair of upper holes 26, and preferably a pair of lower holes 28 as well, provided in the rear wall 16 for receiving bolts (not shown) which are treadably received by the license plate support structure. In the preferred embodiment a pair of brace members 30 having holes 26A and 28A which register with the holes 26 and 28, are secured to the rear wall 16 to ensure that the housing can be securely mounted on the license plate support structure. Further, the metal grommets 32 can be positioned over the brace members 30 so as to register with the holes 26A and 28A to further strengthen the rear wall 16 proximate the points where it engages the license plate support structure. It will be understood by those skilled in the art that the reinforcing of the rear wall with the brace members 30 and the grommets 32 allows the housing 12 to be constructed of a lightweight metal, or a lightweight but durable plastic, without compromising the secure attachment of the housing 12 to the license plate support structure.

The display device 10 also comprises at least one electric lamp 34 mounted within the lamp housing 12. In the preferred illustrated embodiment the lamp 34 includes a pair of oppositely disposed sockets 36 and 38 mounted on the rear wall 16 which releasably receive and support a bulb 40. Of course, the sockets 36 and 38 are connected by suitable circuitry 41 to an electrical supply source, such as the electrical system of the vehicle on which the device 10 is mounted. It will, however, be understood that various lamp configurations can be utilized, such as a lamp including a single socket and bulb, or a lamp including multiple sockets and bulbs.

The lamp 34 is utilized to selectively illuminate a display panel 42 which is mounted so as to cover the opening 14 of the housing 12. Preferably all, or a selected portion, of the panel 42 is translucent such that when the lamp 34 is energized the translucent portion is illuminated, but does not allow perception of distinct images from within the housing 18. However, all or a portion of the panel 42 can be transparent if desired. Further, the preferred embodiment of the device 10 contemplates the imprinting of indicia 44 on the panel 42, such as text or graphics. Thus, for example, if a user wishes to display his or her allegiance to a particular sports team or advertise a product, the team or product name can be imprinted on the panel 42.

With respect to the mounting of the panel 42 in the lamp housing 12, in the preferred embodiment the lamp housing 12 defines a recess 46 about the perimeter of the opening 14 so as to define a shoulder 48 for engaging and supporting the outer edges of the panel 42. In order to secure the panel 42 in place, the housing 12 defines a plurality of selectively spaced screw bosses 50 which register with holes 52 provided in the panel 42 such that the screws 54 are received through the holes 52 and threadably secured in the screw bosses 50. Further, a gasket 56 can be secured between the shoulder 48 and the panel 42 to prohibit water from entering into the housing 12 if desired.

Where the display device 10 is mounted on the license plate support structure in the rear of the vehicle, or on the license plate support structure in the front of the vehicle in jurisdictions where a front license plate is required, accommodations must be made for the mounting of the license plate. Therefore, in the preferred embodiment the device 10 is provided with license plate support means for securing a license plate to the housing 12. In the illustrated embodiment such means include at least one and preferably a pair of mounting brackets 58 secured to the bottom portion of the housing 12. The mounting brackets are provided with holes 60 therein for receiving suitable fasteners for securing the license plate (not shown) and include a hinge 62 to allow the plate to pivot should the plate strike an obstruction. Moreover, biasing means, such as a torsional spring (not shown), can be provided for biasing the plate to a normal vertical position. It will also be noted that light apertures 64 can be provided in the lower wall 20 of the housing 12 (see FIG. 3) to allow light emitted by the bulb to illuminate the license plate secured to the brackets 58.

Figure 7:
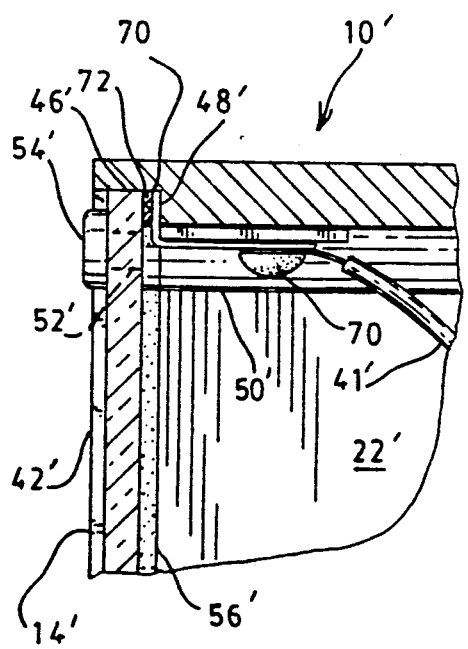
FIG. 7 illustrates a partial side elevation view, in section, of an alternate embodiment of the illuminated display device of the present invention.
Figure 5:
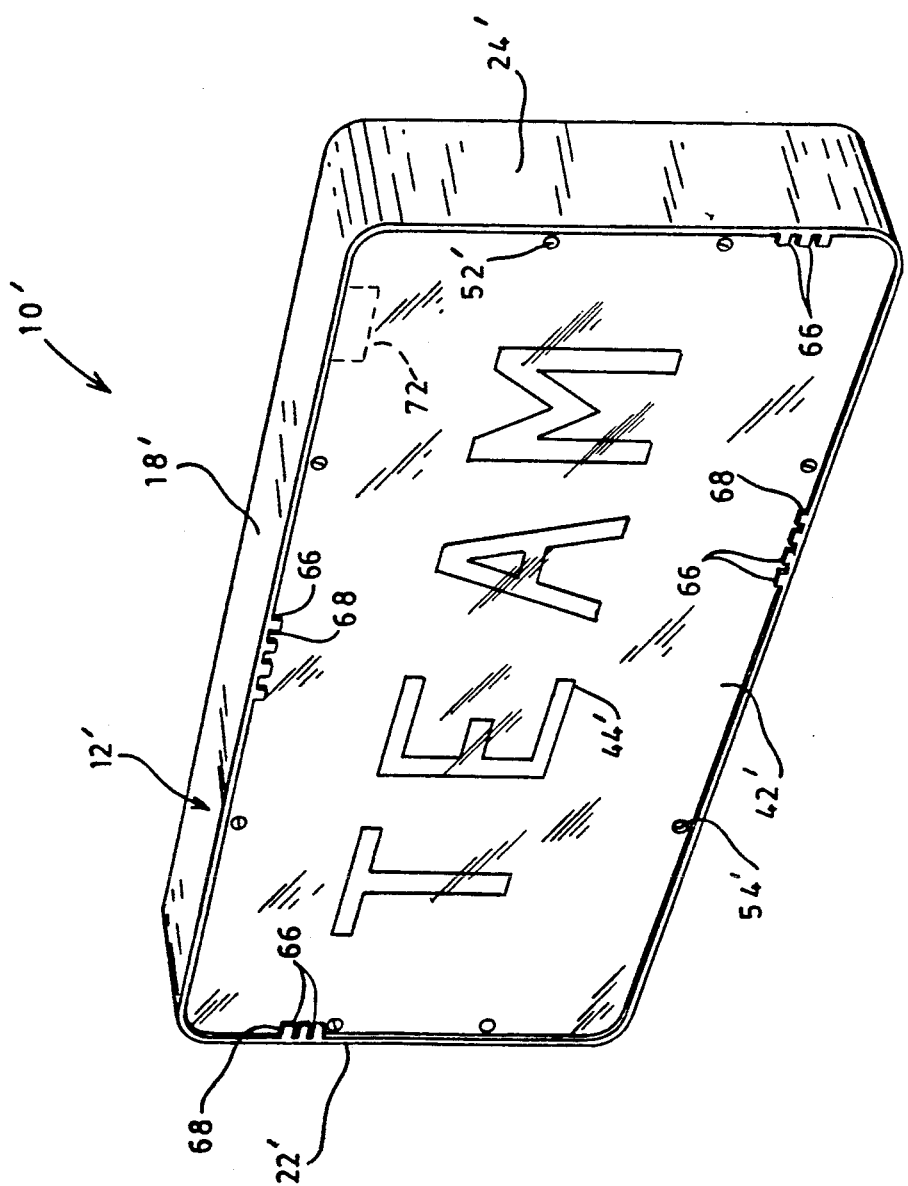
FIG. 5 illustrates a perspective view of an alternate embodiment of an illuminated display device of the present invention.
Figure 6:
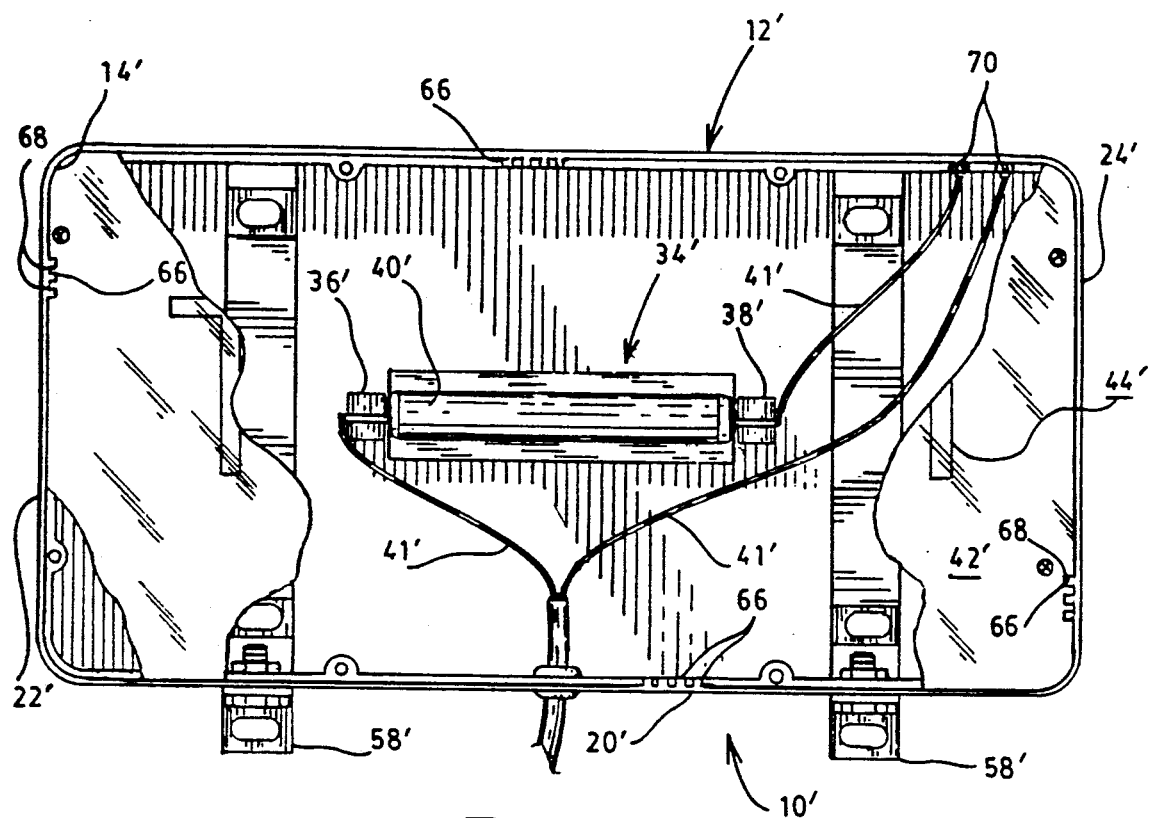
FIG. 6 illustrates a front elevation view, partially in section, of an alternate embodiment of an illuminated display device of the present invention.

In FIGS. 5-7 an alternate embodiment of the display device of the present invention is referenced at 10'. Features of the device 10' which are common to the device 10 described above are referenced with common prime numbers. The display device 10' is designed to discourage theft or piracy of the display panel 42' by configuring a panel or group of panels 42' to be received only by housing 12' having a specific configuration. In the preferred embodiment this is accomplished by providing a key structure in the recess 46' of the housing 12' at selectively spaced locations, the key structure including one or more protrusions 66. Cooperatively, the panel or panels 42 to be received in the housing 12' are provided with registering slots 68 which receive the protrusions 66. Accordingly, panels 42' not having properly keyed slots 68 will not be received by the housing 12'. By configuring a panel or group of panels 42' to fit only a specific housing theft is discouraging because the thief cannot assume that a stolen panel will be received by the housing in which he intends to use it.

Theft can also be discouraged by selectively interrupting the electrical circuit established by the circuitry 41' with two selectively positioned and spaced electrical contact members 70 mounted on one of the walls of the housing 12' proximate the opening 14', as best illustrated in FIGS. 6 and 7. To complete the circuit and, thus, allow the lamp 34' to be energized, a panel 42' must be used which carries an electrically conductive bridge 72 located in the proper position on the interior surface of the panel 42' to engage and span the gap between the contact members 70. Accordingly, various housings 12' will have the contact members 70 at differing locations and a panel or group of panels 42' will be provided with conductive bridges 72 suitably located for completing the circuit necessary to energize the lamp 34'. It is also contemplated that an anti-theft alarm system can be incorporated which is triggered by attempted removal of the panel 42 and/or attempted removal of the housing 12 from the license plate support structure.

Figure 8:
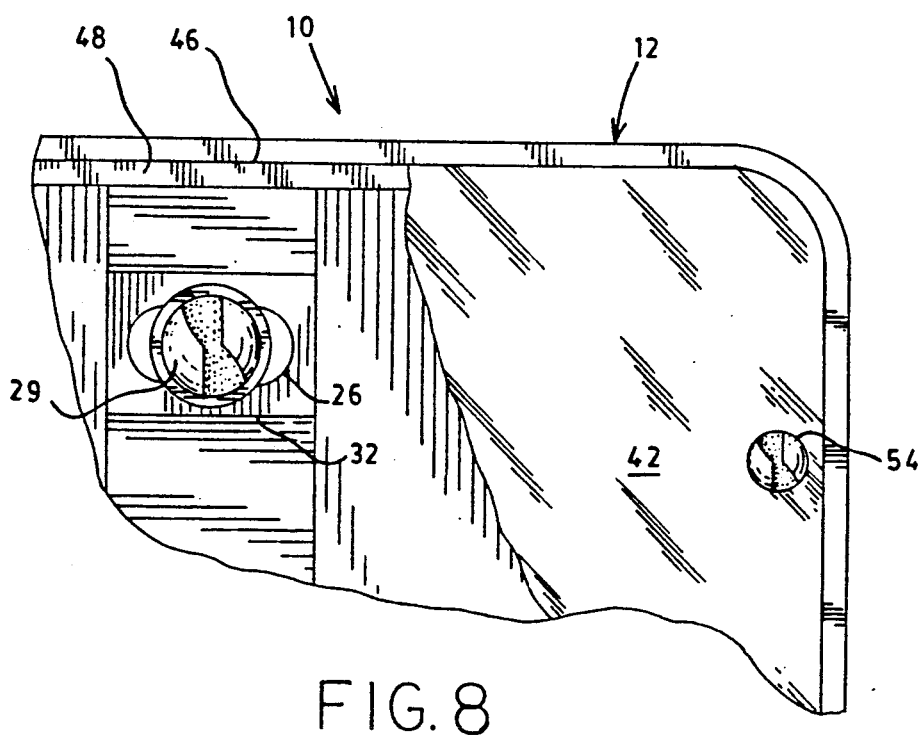
FIG. 8 illustrates a partial front elevation view, partially in section, of an alternate embodiment of an illuminated display device of the present invention.

Referring now to FIG. 8, it will be noted that theft of the panel 42 can be further discouraged by securing the panel 42 to the housing 12 with one-way screws, such as the illustrated screws 54'. It will be understood by those skilled in the art that a conventional screwdriver can be used to threadably insert such screws 54', but a specialized tool is required for removing the screws. Of course, utilizing such screws 54' prohibits not only the theft of the panel 42, but also the housing 12 since the panel 42 must be removed in order to access the bolts securing the housing 12 to the license plate support structure. It will, however, be recognized that the bolts for securing the housing 12 to t he license plate support structure can be one-way threadable bolts, such as the illustrated bolt 29.

In light of the above it will be appreciated that the present invention provides an illuminated display device for a vehicle which is mounted on the license plate support structure at either the front or back of the vehicle. The lamp housing of the device can interchangeably receive various display panels and those display panels can be keyed for use only with a specific lamp housing. Moreover, the display device provides for the mounting and illumination of a license plate if necessary.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An illuminated display device for a vehicle, said vehicle including a license plate support structure, said display device comprising:

a lamp housing for being secured to said license plate support structure in lieu of a license plate, said housing having a rear wall for engaging said license plate support structure and defining a forwardly disposed opening, said housing also including a lower portion provided with license plate support means for engaging and supporting a license plate below said opening, said license plate support means including at least one license plate engaging bracket incorporating a hinge whereby a license plate is pivotally secured to said lower portion of said lamp housing, said lower portion defining at least one light aperture;

a display panel for covering said opening of said lamp housing, at least a portion of said display panel being translucent;

at least one lamp mounted within said lamp housing for illuminating said display panel and for emitting light through said light aperture to illuminate a license plate secured to said license plate support means whereby said display panel and said license plate can be simultaneously supported, displayed and illuminated by said display device.

2. The illuminated display device of claim 1 wherein said lamp is provided with circuitry means for connecting said lamp to an electrical power source, said circuitry means including wire for completing an electrical circuit between said lamp and said power source, said circuitry means including a pair of selectively positioned, spaced apart electrical contacts within said electrical circuit so as to define a break in said circuit, said circuitry means also including an electrically conductive bridge mounted on the rear surface of said display panel for engaging said spaced apart contacts and completing said electrical circuit.

3. The illuminated display device of claim 1 wherein said housing defines a recess about the perimeter of said opening for receiving the outer edges of said display panel to facilitate the mounting of said display panel in said opening.

4. The illuminated display device of claim 3 wherein said housing includes at least one selectively placed key structure disposed in said recess, said key structure including at least one protrusion, and wherein said display panel defines at least one slot for registering with and receiving said protrusion as said display panel is received in said recess of said housing.

5. The illuminated display device of claim 1 wherein said display panel is secured to said housing with a plurality of one-way screws to discourage theft of said device.

6. An illuminated display device for a motor vehicle, said vehicle including a license plate support structure, said display device comprising:

a lamp housing for being secured to said license plate support structure, said housing having a rear wall for engaging said license plate support structure and having a lower portion, said lamp housing defining a forwardly disposed opening, said housing being provided with a recess about the perimeter of said opening, said housing further including at least one selectively positioned key structure disposed in said recess, said key structure including at least one protrusion;

a display panel for covering said opening of said lamp housing, at least a portion of said display panel being capable of transmitting at least some light therethrough, said display panel having an outer edge for being received in said recess of said housing, said display panel being provided with at least one selectively positioned slot for registering with and receiving said protrusion as said display panel is received in said recess of said housing, whereby said display panel is specifically configured to be received by a certain said housing; and at least one lamp mounted within said lamp housing for illuminating said display panel.

7. The illuminated display device of claim 6 wherein said lower portion of said lamp housing defines at least one light aperture for allowing light emitted by said lamp to be transmitted through said aperture for illuminating said license plate secured to said license plate support means whereby said lamp serves to illuminate both said display panel and said license plate.

8. The illuminated display device of claim 6 wherein said license plate support means includes at least one license plate engaging bracket incorporating a hinge whereby a license plate is pivotally secured to said lower portion of said lamp housing.

9. An illuminated display device for a motor vehicle, said vehicle including a license plate support structure, said display device comprising:

a lamp housing for being secured to said license plate support structure, said housing having a rear wall for engaging said license plate support structure and having a lower portion, said lamp housing defining a forwardly disposed opening, said housing defining a recess about the perimeter of said opening and having at least one selectively positioned key structure disposed in said recess, said key structure including at least one protrusion;

a display panel for covering said opening of said lamp housing, at least a portion of said display panel being capable of transmitting at least some light therethrough, said display panel defining outer edges for being received in said recess of said housing to facilitate the mounting of said display panel in said opening, said display panel further defining at least one slot for registering with and receiving said protrusion as said display panel is received in said recess of said housing;

at least one lamp mounted within said lamp housing for illuminating said display panel; and a license plate support means provided on the exterior of said lamp housing for engaging and supporting a license plate, whereby said display device serves to support and display both said display panel and said license plate.

10. An illuminated display device for a motor vehicle, said vehicle including a license plate support structure, said display device comprising:

a lamp housing for being secured to said license plate support structure, said housing having a rear wall for engaging said license plate support structure and having a lower portion, said lamp housing defining a forwardly disposed opening;

a display panel for covering said opening of said lamp housing, at least a portion of said display panel being capable of transmitting at least some light therethrough;

at least one lamp mounted within said lamp housing for illuminating said display panel;

circuitry means for connecting said lamp to an electrical power source, said circuitry means including wire for completing an electrical circuit between said lamp and said power source, said circuitry means also including a pair of selectively positioned, spaced apart electrical contacts within said electrical circuit so as to define a break in said circuit, said circuitry means further including an electrically conductive bridge mounted on the rear surface of said display panel for engaging said spaced apart contacts and completing said electrical circuit; and a license plate support means provided on the exterior of said lamp housing for engaging and supporting a license plate, whereby said display device serves to support and display both said display panel and said license plate.

11. An illuminated display device for a vehicle, said vehicle including a license plate support structure, said display device comprising:

a lamp housing for being secured to said license plate support structure in lieu of a license plate, said housing having a rear wall for engaging said license plate support structure and defining a forwardly disposed opening, said housing defining a recess about the perimeter of said opening and including at least one selectively placed key structure disposed in said recess, said key structure including at least one protrusion, said housing also including a lower portion provided with license plate support means for engaging and supporting a license plate below said opening, said lower portion defining at lest one light aperture;

a display panel for covering said opening of said lamp housing, at least a portion of said display panel being translucent, said display panel defining outer edges for being received in said recess of said housing to facilitate the mounting of said display panel in said opening, said display panel defining at least one slot for registering with and receiving said protrusion as said display panel is received in said recess of said housing;

at least one lamp mounted within said lamp housing for illuminating said display panel and for emitting light through said light aperture to illuminate a license plate secured to said license plate support means whereby said display panel and said license plate can be simultaneously supported, displayed and illuminated by said display plate.

12. The illuminated display device of claim 11 wherein said lamp is provided with circuitry means for connecting said lamp to an electrical power source, said circuitry means including wire for completing an electrical circuit between said lamp and said power source, said circuitry means including a pair of selectively positioned spaced apart electrical contacts within said electrical circuit so as to define a break in said circuit, said circuitry means also including an electrically conductive bridge mounted on the rear wall surface of said display panel for engaging said spaced apart contacts and completing said electrical circuit.

* * * * *